March 31, 1970     B. W. BREECE     3,504,338
CIRCUIT FOR SEQUENTIALLY ENERGIZING A PLURALITY OF LOADS
Filed Dec. 8, 1967     2 Sheets-Sheet 1
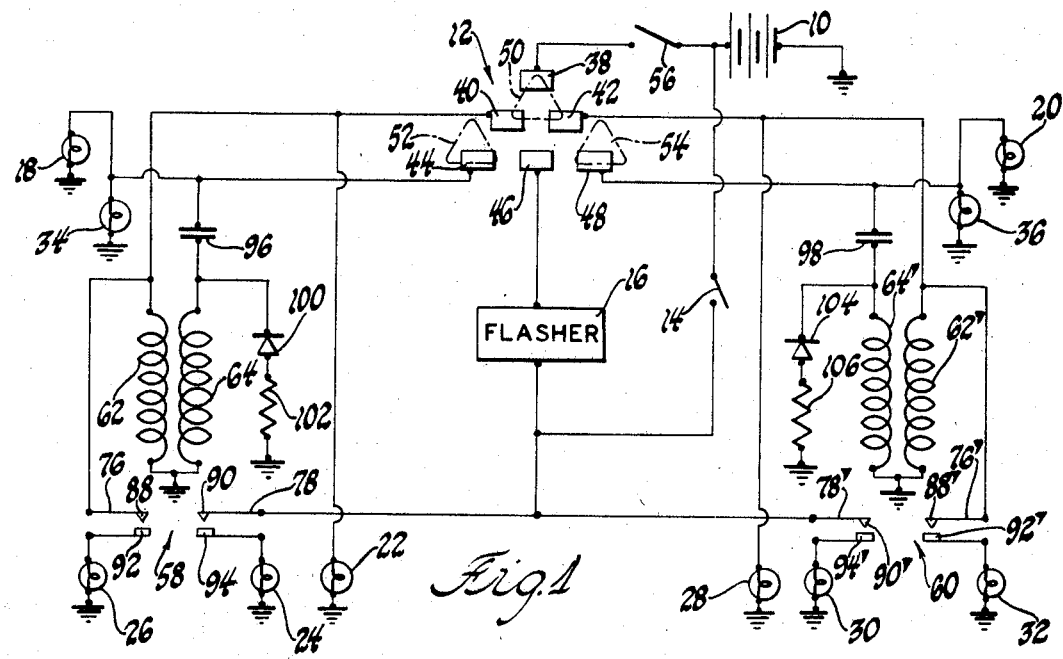
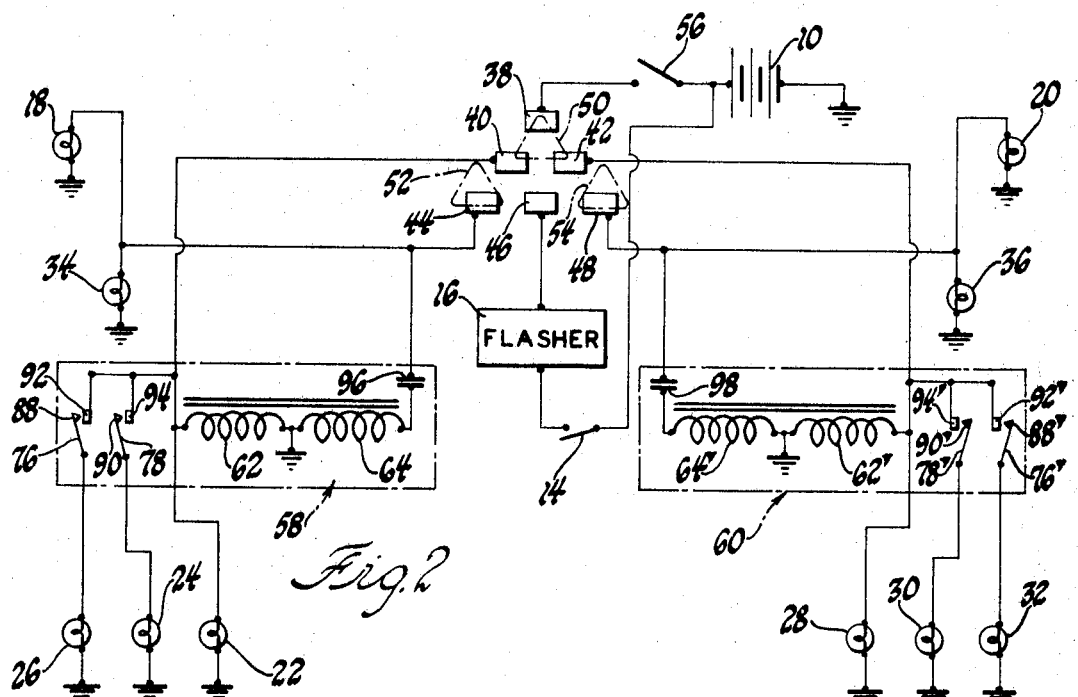
INVENTOR.
*Burton W. Breece*
BY
*Albert F. Duke*
ATTORNEY INVENTOR.
Burton W. Breece
BY
Albert F. Duke
ATTORNEY

United States Patent Office 3,504,338
Patented Mar. 31, 1970

3,504,338
CIRCUIT FOR SEQUENTIALLY ENERGIZING A PLURALITY OF LOADS
Burton W. Breece, Flint, Mich., assignor to General Motors Corporation, Detroit, Mich., a corporation of Delaware
Filed Dec. 8, 1967, Ser. No. 689,119
Int. Cl. B06q *1/38;* H01h *51/20*
U.S. Cl. 340—67                 4 Claims

ABSTRACT OF THE DISCLOSURE

A circuit including a relay which is energized by a flasher and which has a pair of armatures responsive to different flux levels and connected respectively in series with a pair of lamps. The relay further includes a pair of parallel connected bifilar wound coils with a capacitor in series with one coil to progressively establish the different flux levels and sequentially attract the armatures.

---

This invention relates to circuits for sequentially energizing a plurality of loads and more particularly, to such a circuit including a relay provided with a plurality of armatures actuable in response to different flux levels and relay control means for periodically and sequentially establishing the flux levels. The invention is useful in a variety of applications including sequentially energizing a plurality of turn signal lamps to indicate the direction of an intended turn.

Motor vehicles are presently provided with signal lamps mounted on each side and at the front and rear of the vehicle. These lamps are connected in the turn signal circuit to be selectively and periodically energized by operation of a turn signal switch mounted at the steering column and thereby to signal the direction of the intended turn. A cancelling mechanism is provided which is responsive to steering wheel rotation to automatically open the turn signal switch when the turn has been completed. It has been proposed that a plurality of lamps on each side of the vehicle be sequentially energized to indicate the direction of the intended turn. These proposals have taken various forms including the use of a motor driven contactor and the use of electronic switching circuitry. Such systems involve complexities which increase their overall cost and in some instances require redesign of the conventional turn signal components such as the turn signal switch.

With the foregoing in mind it is an object of the present invention to provide a simple and inexpensive circuit for sequentially energizing a plurality of loads.

It is another object of this invention to provide a turn signal circuit including a relay structure for sequentially controlling a plurality of lamp loads.

It is a further object of this invention to provide a sequential turn signal circuit which is compatible with present turn signal components.

It is a still further object of this invention to provide a sequential turn signal circuit including a lamp control relay having a pair of armatures actuable in response to different flux levels and a capacitor for controlling the flux developed by the relay to sequentially actuate the armatures.

The foregoing and other objects of the present invention are attained by a novel circuit including a flasher arranged to periodically energize a sequencer relay provided with a plurality of armatures connected respectively in series with a plurality of signal lamps. The relay includes a pair of coils arranged to produce magnetic flux in opposite directions. A capacitor is connected in series with one of the coils and the charging of the capacitor progressively raises the net flux level. The armatures are actuable at different flux levels to sequentially energize the signal lamps.

A more complete understanding of the present invention may be had from the following detailed description which should be read in conjunction with the drawings in which:

FIGURE 1 is a schematic diagram of one embodiment of the present invention;

FIGURE 2 is a schematic diagram of a second embodiment of the present invention;

Figure 3:
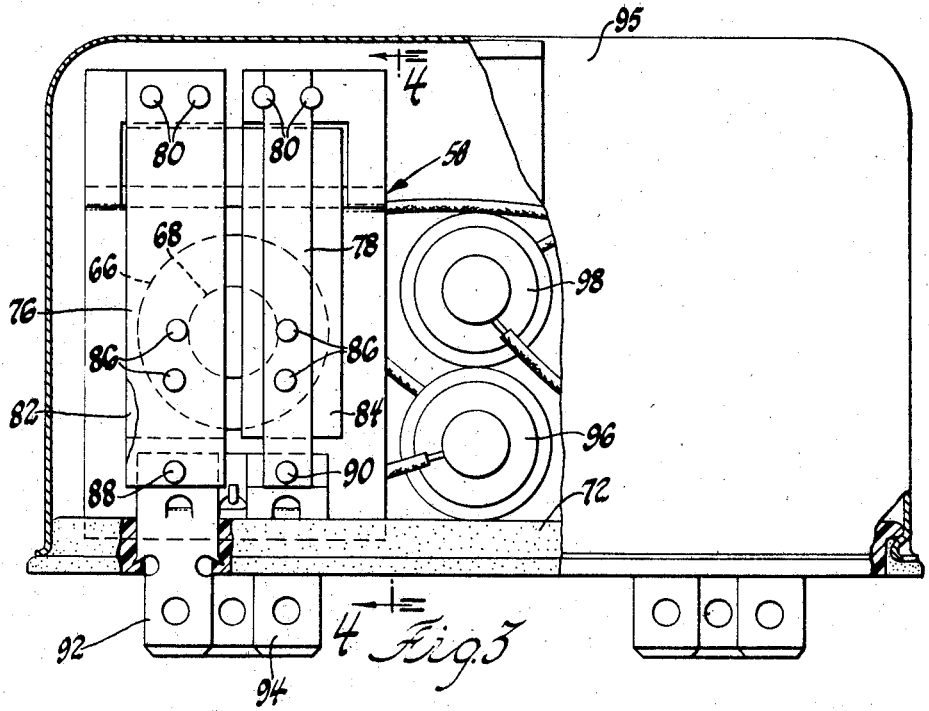
FIGURE 3 is an elevation view with parts broken away to show the structure of one of the two dual armature relays utilized in the present invention.

Referring now to the drawings and initially to FIGURE 1, the circuit of the present invention comprises a source of D-C voltage such as a battery 10 which is connected to a turn signal switch generally designated 12 through an ignition switch 14 and a conventional current sensitive flasher 16.

The turn signal switch 12 is of conventional design and includes a plurality of stationary and movable contacts arranged to selectively establish electrical connections in accordance with the movement of a turn signal lever operable by the driver of the vehicle. Structural details regarding the switch 12 and the switch actuating mechanism may be had by reference to the patent to Lincoln et al. 2,643,308.

A plurality of signal lamps which may be suitably mounted on the left and right sides of the vehicle are shown in FIGURE 1 and include a left and right front signal lamps 18 and 20 respectively, and a bank or cluster of left and right rear signal lamps 22, 24 and 26, and 28, 30, 32 respectively. Left and right pilot lamps 34 and 36 respectively, are mounted within the vehicle to indicate operation of the respective signal lamps.

The turn signal switch 12 as schematically illustrated comprises six stationary contacts 38, 40, 42, 44, 46 and 48 and three movable contacts 50, 52 and 54. The stationary contact 38 is connected to the battery 10 through a brake pedal operated switch 56 while the stationary contact 46 is connected directly to one terminal of the flasher 16. The stationary terminals 40 and 42 are connected respectively and directly to left and right rear lamps 22 and 28, while the stationary contacts 44, and 48 are connected respectively to left and right front signal lamps 18 and 20 and pilot lamps 34 and 36. The stationary contacts 40 and 44 are also connected to a dual armature sequencing relay 58 while the stationary contacts 42 and 48 are connected to an identical dual armature sequencing relay 60.

Figure 4:
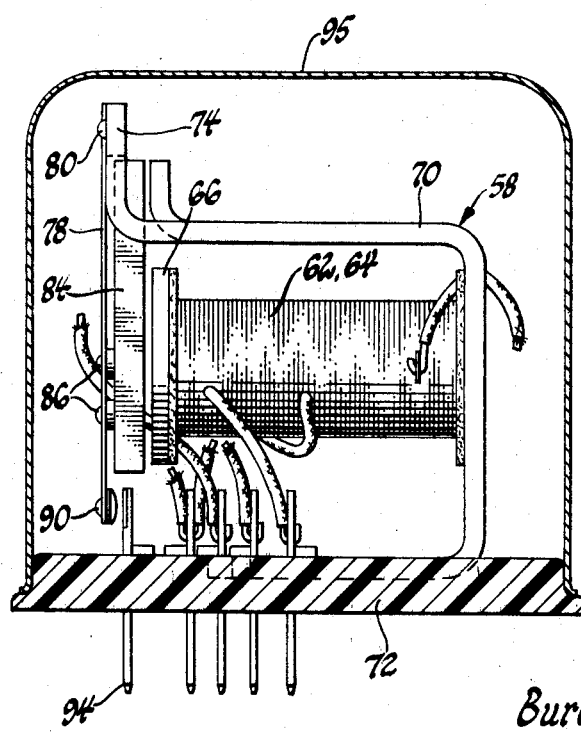
FIGURE 4 is a sectional view taken along lines 4—4 of FIGURE 3.

Referring now to FIGURES 3 and 4, the relay 58 comprises a pair of bifilar wound coils 62 and 64. The coils 62 and 64 are wound on a spool 66 formed of insulating material which receives a steel core 68. The spool 66 is supported by a bracket 70 which is secured to an insulating base member 72 and is provided with a bent-out flange 74. Armature biasing spring 76 and 78 are secured to the flange 74 by suitable means such as rivets 80. A pair of armatures 82 and 84 are secured by suitable means such as rivets 86 to the biasing springs 76 and 78 respectively. The spring 76 is larger and has a different spring rate than spring 78 so that a greater amount of flux is required to pull in the armature 82 than is required to pull in the armature 84. Each of the springs 76 and 78 is provided at its opposite end with contacts 88 and 90 respectively. One terminal of each of the coils 62 and 64 is grounded with the other terminals being connected in circuit such that current flow through the coil 62 develops flux in opposition to that developed by current flow through the coil 64. A pair of relay terminals 92 and 94 are arranged to be engaged by the contacts 88 and 90 respectively upon actuation of the armatures 82 and 84 respectively. The relays 58 and 60 are housed within a cover 95 which is staked to the insulating base member 72. The relays 60 which is not shown in FIGURES 3 and 4 is as previously mentioned identical in structure with the relay 58 and corresponding elements have been designated by prime numbers in FIGURE 1.

Referring again to FIGURE 1, relay coils 62 and 62' are connected directly to the stationary contacts 40 and 42, respectively of the turn signal switch 12, while the relay coils 64 and 64' are connected to the stationary terminals 44 and 48 respectively through capacitors 96 and 98 respectively. The left rear lamp 26 is connected to the stationary terminal 40 through the contact 88 and terminal 92 of the relay 58. Likewise, the right rear signal lamp 32 is connected to the terminal 42 through the contact 88' and terminal 92' of the relay 60. It will be noted that the left and right rear signal lamps 24 and 30 are not connected with the turn signal switch 12. Instead the lamp 24 is connected to the battery 10 through the ignition switch 14, the contact 90, terminal 94, of relay 58 while the lamp 30 is connected to the battery 10 through the ignition switch 14, the contact 90', terminal 94' of the relay 60. A diode 100 and a resistor 102 are connected in parallel with the coil 64 of the relay 58 and a diode 104 and a resistor 106 are connected in parallel with the coil 64' of the 60 for a purpose which will be more fully discussed in connection with the operation of the circuit.

The operation of the embodiment shown in FIGURE 1 is as follows:

With the switch 12 in the neutral position, as shown, the coils 64 and 64' are open circuited at the stationary contacts 44 and 48 respectively. The movable contact 50 bridges the stationary contacts 38, 40 and 42 and connects the lamps 22, 28 and the relay coils 62, 62' to the battery 10 through the normally open brake operated switch 56. Upon application of the brake, the switch 56 closes, energizing the lamps 22 and 28 and the coils 62 and 62'. The magnetic flux developed by the coils 62 and 62' immediately attract both armatures 82, 84 and 82', 84' (FIGURE 3) respectively to connect the lamps 26 and 32 to the battery 10 through switch 56 and to connect the lamps 24 and 30 to the battery 10 through the ignition switch 14. Thus all rear lamps on both sides of the vehicle are constantly energized to indicate a slowing of the vehicle.

When the turn signal switch 12 is actuated to indicate a left turn the movable contact 50 bridges stationary contacts 40, 44 and 46 while the movable contact 50 breaks the connection between the contacts 38 and 40 while maintaining a connection between contacts 38 and 42. In this position current immediately flows to the signal lamps 18, 22 and pilot lamp 34 through the flasher 16 which is normally closed. Current also flows through the flasher 16 to the relay coils 62 and 64. As previously mentioned, the magnetic flux developed by current flow through the coil 62 is in opposition to that developed by current flow through the coil 64. Since the capacitor 96 at this time has accumulated no charge, the current flow through the coils 62 and 64 is substantially identical, and the net flux developed by the coils 62 and 64 is substantially zero. As the capacitor 96 begins to accumulate a charge the current flow through the coil 64 decreases and the magnetic flux developed thereby decreases. Since the current flow through the coil 62 does not change, it will be apparent that the net flux in the magnetic circuit of the coils 62 and 64 will increase. At a point determined by the spring rate of the armature biasing spring 78, the net flux will be sufficient to actuate the armature 84 to engage contact 90 and terminal 94 connecting the lamp 24 to the battery 10 through the ignition switch 14. As the capacitor 96 further accumulates charge the current through the coil 64 decreases to a point where the net flux developed by the coils 62 and 64 is sufficient to actuate the armature 82. This closes the circuit between the contact 88 and terminal 92 connecting the lamp 26 to the battery 10 through the flasher 16. At this point the lamps 22, 24 and 26 have been sequentially energized in the direction of a left turn. The flasher 16 is designed to flash a three signal lamp load at a predetermined rate. Consequently, the three signal lamps connected in series with the flasher 16, namely, the lamps 18, 22 and 26 must all be energized before the flasher 16 becomes very effective in timing the "on" portion of the flashing cycle. The lamp 24 being connected in parallel with the flasher 16 does not affect the flashing rate. A predetermined interval of time after the energization of the lamp 26, the thermal element of the flasher 16 is heated sufficiently to open the circuit to the battery 10. The lamps 18, 22, 26 and 34 being connected in series with the flasher 16 are instantaneously deenergized.

Since the lamp 24 is connected in parallel with the flasher 16 the opening of the flasher 16 does not deenergize the lamp 24. Although the relay 58 has been disconnected from the source 10 by opening of the flasher 16, the discharge current of the capacitor 96 through the coil 64 would tend to maintain the contact 78 and terminal 94 closed, maintaining the energization of the lamp 24. To prevent this, and thereby deenergize all of the lamps simultaneously, the diode 100 and the resistor 102 are connected in parallel with coil 64 so that substantially all the discharge current from the capacitor 96 is bypassed from the relay coil 64 permitting it to drop out, deenergizing the lamp 24. The opening and closing of the flasher 16 repeats this cycle until the turn signal switch 10 is returned to the neutral position.

If at any time during the left turn indication the brakes are applied, the brake pedal actuated switch 56 will connect the lamp 28 and the coil 62' to the battery 10 through the movable contact 50 and the stationary contacts 38 and 42. Energization of the coil 62' will cause engagement of the contacts 88', 90' with the terminals 92', 94' respectively to energize the lamps 32 and 30. Thus all the lamps on the right rear side of the vehicle will be constantly energized indicating that the vehicle is slowing preparatory to making a turn. Closure of the switch 56 will not affect the operation of the lamps on the left side of the vehicle since the connection between the stationary contacts 38 and 40 is broken when signalling a left turn.

A similar action takes place when the turn signal switch 12 is placed in the right turn position. At that time the movable contact 54 bridges stationary contacts 42, 46 and 48 while the movable contact 50 bridges contacts 38 and 40.

A second embodiment of the invention is shown in FIGURE 2. Corresponding elements of FIGURES 1 and 2 are designated with corresponding numbers. In this embodiment the flasher 16 is designed to carry a four signal lamp load as opposed to the three signal lamp load in the embodiment in FIGURE 1. This permits a substantial simplification of the circuit shown in FIGURE 1. In FIGURE 2 the left signal lamps 18, 22, 24 and 26 all receive energizing current through the flasher 16 as do the right signal lamps 20, 28, 30 and 32. This differs from the embodiment in FIGURE 1 wherein the lamps 24 and 30 received current from the battery 10 bypassing the flasher 16. This eliminates the problem associated with the discharge current from the capacitors 96 and 98 in FIGURE 1. Accordingly, diodes 100, 104 and resistors 102, 106 in FIGURE 1 have been eliminated from FIGURE 2. These elements are no longer necessary because the small delay in the release of the relays 58 and 60 in FIGURE 2 due to the discharge current from the capacitors 96 and 98 respectively cannot affect lamp energization. All the lamps are disconnected from the source 10 as soon as the flasher 16 opens. The discharge current flow from the capacitors 96, 98 through the front lamps 18, 20 and pilot lamps 34, 36 is insufficient to energize these lamps. While the discharge current flowing through the coils 64 and 64' delays the opening of relays 58 and 60 the delay is not as long as the "off" portion of the flasher 16. Otherwise the circuit shown in FIGURE 2 operates in the same manner as the circuit of FIGURE 1. Thus in FIGURE 2, with the turn signal switch 12 in the left turn position, the lamps 22, 24 and 26 are sequentially energized each time the flasher 16 closes and are simultaneously deenergized each time the flasher 16 opens.

I claim:

1. A sequential turn signal circuit comprising a source of voltage, a turn signal switch connected in series with said source, a flasher connected between said turn signal switch and said source for periodically disconnecting said switch from said source, a relay having a pair of coils and a pair of armatures, one terminal of each of said coils being connected in series with said turn signal switch, the other terminals of each of said coils being connected to a reference potential whereby current flow through one of said coils develops magnetic flux in opposition to that developed by current flow through the other of said coils, a capacitor connected in series with one of said coils to vary the current flow therethrough whereby the net magnetic flux developed by said coils varies between a minimum and a maximum over a predetermined interval of time, said armatures being actuable in response to different levels of magnetic flux, first, second and third turn signal lamps, said first turn signal lamp being connected in series with said turn signal switch, contact means operable by each of said armatures and connected in series with said turn signal switch and said second and third lamps respectively, whereby said first, second and third lamps are energized in sequence upon closure of said turn signal switch and are simultaneously deenergized by operation of said flasher.

2. A sequential turn signal circuit comprising a source of voltage, a flasher and a turn signal switch connected in series with said source, first, second and third turn signal lamps, a relay including a pair of coils and a pair of armatures, contact means operable by each of said armatures and connected in series with said second and third signal lamps, said first and third signal lamps being connected in series with said turn signal switch and said flasher, said second signal lamp being connected in parallel with said flasher, means connecting said coils in series with said turn signal switch whereby current flow through one of said coils develops magnetic flux in opposition to that developed by current flow in the other of said coils, a capacitor connected in series with one of said coils whereby the net flux developed by said coils varies from a minimum to a maximum over a predetermined time interval, said armatures being actuable in response to different levels of magnetic flux, whereby said first, second, third signal lamps are energized in sequence upon closure of said turn signal switch and said flasher, capacitor discharge means connected in parallel with said one of said coils to provide a discharge path for said capacitor independent of said one of said relay coils, whereby said first, second and third turn signal lamps are simultaneously deenergized upon opening of said flasher.

3. The circuit of claim 2 wherein said capacitor discharge means includes a diode and resistor, said diode being connected to prevent current flow through said resistor during charging of said capacitor.

4. A turn signal circuit for selectively energizing a plurality of left and a plurality of right turn signal lamps, comprising a source of voltage, a pair of relay means, each of said relay means including a pair of coils, and a pair of armatures, switch means including a turn signal switch and a flasher connected in series with said source, each coil of said pair of coils being connected in series with said turn signal switch whereby current flow through one coil of said pair of coils develops magnetic flux in opposition to that developed by current flow in the other coil of said pair of coils, a capacitor connected in series with said one coil of said pair of coils whereby the net magnetic flux developed by said pair of coils varies from a minimum to a maximum over a predetermined interval of time, the armatures of each of said relay means being actuable in response to different levels of magnetic flux, contact means operable by each of said armatures and adapted to connected said signal lamps to said source, a brake pedal operated switch connected in parallel with said flasher and in series with said turn signal switch, said turn signal switch having a neutral position wherein the other coil of each of said relay means is connected in series with said brake pedal operated switch whereby all of said lamps are energized upon closure of said brake pedal operated switch, said turn signal switch being selectively actuable to left and right turn indicating positions wherein the coils of one of said relay means are connected to said flasher and the said other coil of the other of said relay means is connected to said brake pedal operated switch whereby one of said pluralities of lamps is sequentially energized when the turn signal switch is placed in one of said operating positions and the other of said pluralities of lamps is simultaneously energized upon closure of said brake pedal operated switch while the turned signal switch is in said one of said positions.

References Cited

UNITED STATES PATENTS

| | | | |
|---|---|---|---|
| 152,281 | 6/1874 | Delany | 335—119 X |
| 922,192 | 5/1909 | Rice | 335—267 |
| 2,080,273 | 5/1937 | Holmes | 317—141 |
| 3,123,802 | 3/1964 | Priesemuth | 340—251 X |
| 3,372,313 | 3/1968 | Beck | 335—89 X |
| 3,398,399 | 8/1968 | Brock | 340—74 X |

FOREIGN PATENTS

| | | |
|---|---|---|
| 184,835 | 2/1956 | Austria. |
| 987,936 | 4/1951 | France. |
| 831,510 | 3/1960 | Great Britain. |

JOHN W. CALDWELL, Primary Examiner

K. N. LEIMER, Assistant Examiner

U.S. Cl. X.R.

335—119, 182; 340—82